United States Patent

Kalka et al.

[11] 4,233,437
[45] * Nov. 11, 1980

[54] CONTINUOUS PROCESS FOR THE REMOVAL OF MONOMERIC IMPURITIES FROM AQUEOUS DISPERSIONS OF HOMO- AND COPOLYMERS OF VINYL CHLORIDE

[75] Inventors: Josef Kalka, Herten; Bernhard Hentschel; Jürgen Ziebarth, both of Marl, all of Fed. Rep. of Germany

[73] Assignee: Chemische Werke Huels Aktiengesellschaft, Marl, Fed. Rep. of Germany

[*] Notice: The portion of the term of this patent subsequent to Apr. 26, 1994, has been disclaimed.

[21] Appl. No.: 881,933

[22] Filed: Feb. 28, 1978

Related U.S. Application Data

[63] Continuation of Ser. No. 694,342, Jun. 9, 1976, abandoned.

[30] Foreign Application Priority Data

Jun. 14, 1975 [DE] Fed. Rep. of Germany ....... 2526728

[51] Int. Cl.³ .......................... C08F 6/16; C08F 14/06
[52] U.S. Cl. ............................ 528/500; 260/29.6 PT; 526/344.2; 528/501
[58] Field of Search ................................. 528/500, 501

[56] References Cited

U.S. PATENT DOCUMENTS

| | | | |
|---|---|---|---|
| 3,052,663 | 9/1962 | Bodlaender | 528/500 |
| 3,772,262 | 11/1973 | Clementi | 260/96 R |
| 3,954,910 | 5/1976 | Kropp | 260/879 |
| 3,956,249 | 5/1976 | Goodman | 528/500 |

FOREIGN PATENT DOCUMENTS

| | | | |
|---|---|---|---|
| 1248943 | 8/1967 | Fed. Rep. of Germany | 526/344 |
| 576157 | 3/1946 | United Kingdom | 528/500 |

*Primary Examiner*—C. A. Henderson
*Attorney, Agent, or Firm*—Millen & White

[57] ABSTRACT

In a process for removing monomeric impurities from an aqueous dispersion of homopolymers or copolymers of vinyl chloride having a surface tension below 60 dyn/cm. by treatment with steam while avoiding foam formation by a rapid lowering of the pressure at high flow velocities, the improvement which comprises:
(a) continuously mixing said dispersion in a flow pipe with steam at a steam pressure of 800–4660 millibars for an average residence time of about 0.01–5 seconds;
(b) continuously passing the resultant admixture from said flow pipe at a velocity of at least 30 meters per second directly to a degasification vessel having a pressure of 133–660 millibars; and
(c) continuously recovering a polymer product containing less than 20 p.p.m. residual monomer impurities therefrom.

4 Claims, 1 Drawing Figure

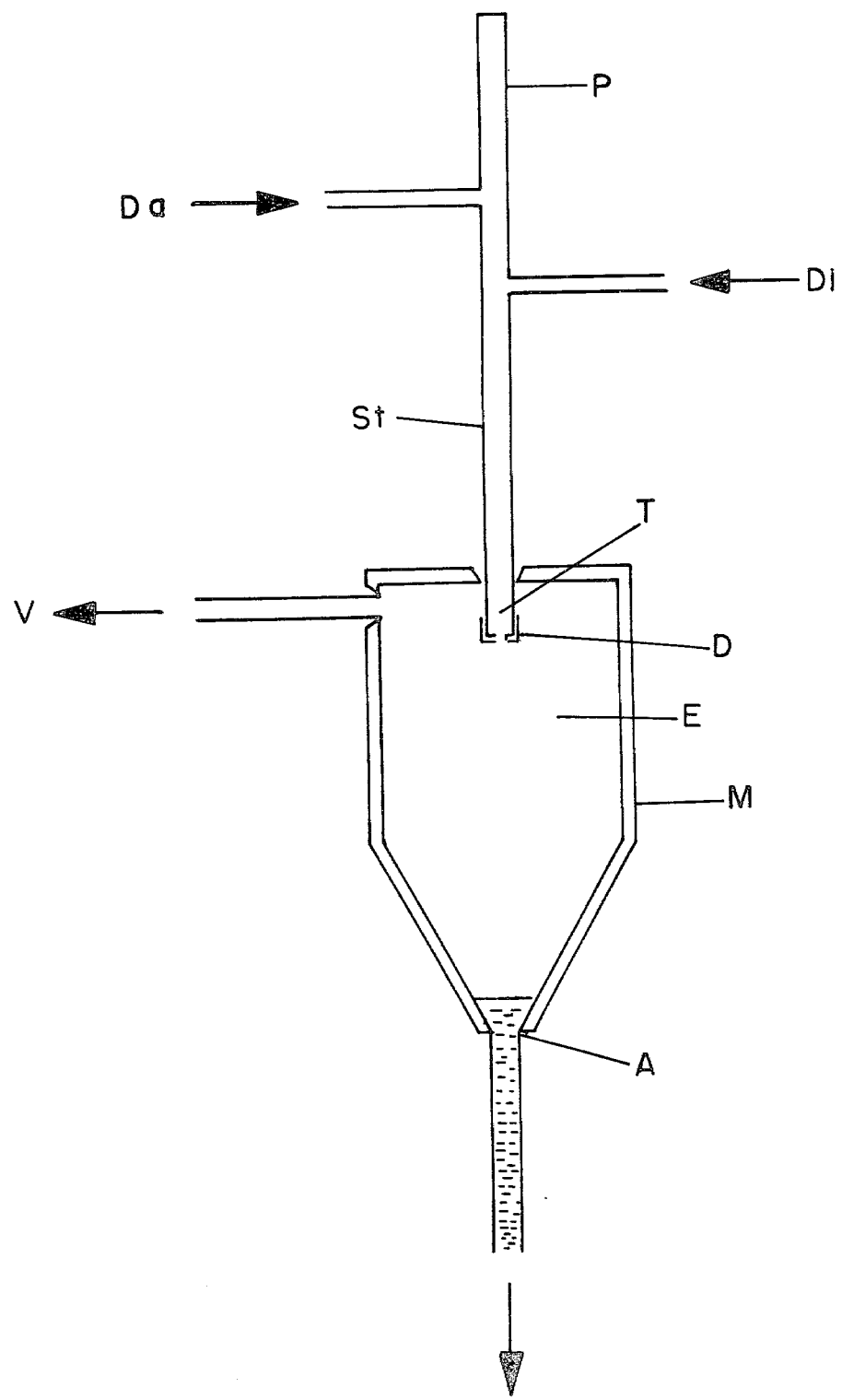

CONTINUOUS PROCESS FOR THE REMOVAL OF MONOMERIC IMPURITIES FROM AQUEOUS DISPERSIONS OF HOMO- AND COPOLYMERS OF VINYL CHLORIDE

This is a continuation of application Ser. No. 694,342 filed June 9, 1976, now abandoned.

BACKGROUND OF THE INVENTION

The manufacture of homo- and copolymers of vinyl chloride by the polymerization in aqueous emulsion is well known, e.g. see the monograph by Kainer, "Polyvinylchlorid and Vinylchlorid-Mischpolymerisate" (Polyvinyl Chloride and Vinyl Chloride Copolymers), Springer publishers, Berlin/Heidelberg/New York, 1965, pp. 34 et seq.

In the emsulsion homo- and copolymerization of vinyl chloride, polymerization is generally not continued to a quantitative conversion of the monomers. In many cases, the polymerization is interrupted intentionally at a low conversion. In all instances, not inconsiderable amounts of residual monomers remain in the dispersions.

The removal of a large part of unreacted monomers is effected by expansion and/or evacuation, customarily in the polymerization vessel; the vinyl chloride, which is removed by suction, is recycled to the gasometer. In spite of these vinyl chloride recovery steps, the aqueous dispersion still contains about 1-2% by weight of monomer, based on the polymer. During the spray drying of these dispersions obtained from the emulsion polymerization, more than 95% by weight of the monomer content escapes into the atmosphere together with the dryer exhaust air. In this case, only residual monomer contents on the order of 1-20 p.p.m. remain in the spray-dried polyvinyl chloride. Such contents can be tolerated even with the stricter requirements now in force with respect to the physiological harmlessness of the products.

During the course of ever increasing efforts to reduce pollution, there is the problem of diminishing the heretofore considerable vinyl chloride emissions in the dryer exhaust air. For this purpose, it is necessary to extensively free the polyvinyl chloride dispersions from monomeric impurities before the drying procedure.

It has been known to free synthetic resin dispersions of readily volatile monomers by storing in large expansion tanks, e.g. see German Pat. No. 1,248,943, Column 2, lines 4–6. However, this mode of operation requires enormously expensive apparatus if it is to be effective.

The prior art has also suggested conducting dispersions made up of polymers, e.g. polyvinyl chloride, countercurrently to rising inert gases in spray adsorbers to thereby free them of readily volatile compounds, e.g. see DOS (German Unexamined Laid-Open Application) No. 2,162,860. This mode of operation also requires excessive expenditure in apparatus.

Steam distillation of polymer dispersions for the purpose of removing readily volatile proportions has also been described, e.g. see German Pat. No. 1,248,943, Column 2, lines 24–28. However, this mode of operation cannot be readily employed with polymer dispersions obtained in emulsion polymerization, since such dispersions, due to their emulsifier content, have such a low surface tension that strong foaming occurs during a steam distillation.

In a conventional, discontinuously operating process described in German Pat. No. 1,248,943, the foam formed during the steam distillation of dispersions with a surface tension of below 40 dynes per centimeter is broken up by subjecting the thus-produced steam-dispersion foam mixture to a rapid pressure drop at flow velocities of more than 100 m./sec. The broken-up foam is recycled from the separator into the steam distillation, but the process operates discontinuously.

An expressly emphasized in German Pat. No. 1,248,943, at Column 5, lines 19–22, the respective process can be operated in a continuous fashion only if several units are connected in series as a cascade. Naturally, such a series connection of several, discontinuously operating units involves a great expenditure for capital equipment. Additionally, the series connection of several units of the aforedescribed type represents a large mechanical load on the dispersions as they are exclusively manufactured in modern, large-scale technical methods which have a high solids content and are low in emulsifier. In a highly undesirable manner, deposits of sediment and coagulate are formed in the pipelines between the degasification vessels from the comparatively low-stability dispersions.

In order to avoid these difficulties, German Patent Application No. P 24 40 957 corresponding to U.S. Pat. No. 4,020,032, issued April 26, 1977 describes a process according to which the dispersion is mixed continuously with steam in a flow pipe, wherein the flow velocity of the mixture is 1–20 m./sec. and the pressure in the flow pipe is 200–800 millibars, the mixture exiting from the flow pipe at a velocity of 30–100 m./sec. and being fed to an evacuated degasification vessel wherein the pressure is by 40–270 millibars lower than the pressure in the flow pipe and being continuously withdrawn from this degasification vessel. The temperatures utilized in this process are, in correspondence with the pressure, no higher than 94° C., since it had to be assumed that dispersions of polymers and copolymers of vinyl chloride cannot be exposed to temperatures higher than 95° C. since according to general experience such dispersions are thermally damaged at higher temperatures, producing discoloring of the polymers as well as formation of coagulate and sediment.

OBJECTS OF THE INVENTION

Accordingly, it is a general object of this invention to provide an improved process for reducing residual monomer content in vinyl chloride emulsion polymerization dispersions.

Another object of this invention is to provide such a process which can be carried out with minimal amounts of capital equipment.

A further object of this invention is to provide such a process which is economical in delivering heat for evaporation.

Yet another object of this invention is to provide such a process which requires reduced maintenance due to substantial freedom from coagulation and sedimentation.

Upon study of the specification and appended claims, further objects and advantages of this invention will become apparent to those skilled in the art.

SUMMARY OF THE INVENTION

Briefly, the above and other objects of the present invention are attained in one aspect thereof by providing, in a process for removing monomeric impurites from an aqueous dispersion of homopolymers or copolymers of vinyl chloride having a surface tension below 60 dyn/cm. by treatment with steam while avoiding foam formation by a rapid lowering of the pressure at high flow velocities, the improvement which comprises:
  (a) continuously mixing said dispersion in a flow pipe with steam at a steam pressure of 800–4660 millibars for an average residence time of about 0.01–5 seconds;
  (b) continuously passing the resultant admixture from said flow pipe at a velocity of at least 30 meters per second directly to a degasification vessel having a pressure of 133–660 millibars; and
  (c) continuously recovering a polymer product containing less than 20 p.p.m. residual monomer impurities therefrom.

BRIEF DESCRIPTION OF THE DRAWING

The objects, features and advantages of the present invention will become more fully apparent to those skilled in the art to which the invention pertains from the following Detailed Discussion taken in conjunction with the annexed Drawing which schematically illustrates an apparatus presently preferred for use with the subject process.

DETAILED DISCUSSION

A process has now been discovered for the removal of monomeric impurities from aqueous dispersions of homo- and copolymers of vinyl chloride with a surface tension of below 60 dyn/cm. by treatment with steam and under avoidance of a foam formation by rapid pressure lowering at high flow velocities. In accordance with this process, the dispersion is continuously mixed with steam in a flow pipe, wherein the steam pressure in the flow pipe ranges between 800 and 4660 mb. (millibars); the mean average residence time is 0.01–5 seconds; the mixture is discharged from the flow pipe at a velocity of $\geq 30$ m./sec.; is fed to an evacuated degasification vessel wherein the pressure is 133–660 mg.; and continuously withdrawn therefrom.

The weight ratio of steam:dispersion is suitably 1:2 to 1:30. Preferably, the steam pressure in the flow pipe is 800–2320 mb.

The process of this invention can be utilized, independently of the type of emulsifier and monomer concentration, with dispersions of homo- and copolymers of vinyl chloride having surface tensions of below 60 dyn/cm. Up to 50% by weight of comonomer can be employed.

Primarily suitable as comonomers are monoolefinic unsaturated compounds, e.g. vinylidene chloride or vinyl esters of straight-chain or branched carboxylic acids of 2–20, preferably 2–4 carbon atoms, e.g. vinyl acetate, vinyl propionate, vinyl butyrate; unsaturated acids, e.g. maleic, fumaric, itaconic, crotonic, acrylic, methacrylic acid, as well as the mono- or diesters thereof with mono- or dialcohols of 1–10 carbon atoms; α-olefins, e.g. ethylene, propylene, isobutylene, styrene, acrylonitrile, polyunsaturated compounds; etc.

The process of this invention can also be used advantageously in dispersions having a high solids content and a low emulsifier content. One mode of operation permitting the production of high-percentage, low-emulsifier dispersions is described in DAS (German Published Application) No. 1,964,029, according to which the emulsifier is added continuously during the polymerization reaction in a certain way.

Suitable catalysts are the water-soluble compounds customary in emulsion polymerization, e.g. hydrogen peroxide, sodium persulfate, potassium persulfate and redox systems, e.g. $H_2O_2$/ascorbic acid, in the usual concentrations. The emulsifiers can be the conventional types, Especially suitable are ionic emulsifiers, e.g. salts of carboxylic acids such as sodium caprinate, sodium laurate, sodium myristate, sodium palmitate, etc. Furthermore suitable are salts of primary and secondary alkyl sulfates, e.g. sodium capryl sulfate, sodium lauryl sulfate, sodium myristyl sulfate, sodium oleyl sulfate, etc. Likewise suitable are sulfates of esterified polyoxy compounds such as monofatty acid glycerol sulfuric acid ester, salts of primary and secondary alkyl sulfonates, e.g. sodium ethyl sulfonate, sodium stearyl sulfonate, sodium oleyl sulfonate, n-alkanesulfonates with a statistical distribution of the sulfonic acid group and a chain length of $C_{13}$–$C_{17}$, etc. It is also possible to employ alkyl aryl sulfonates, e.g. the sodium salt of p-n-dodecylbenzenesulfonic acid.

Furthermore advantageous are mixtures of emulsifiers. Also, additional auxiliary agents can be added to the aforementioned emulsifiers, e.g. alcohols such as lauryl alcohol, esters such as sorbitan monolaurate, and carboxylic acid glycol esters.

The polymerization temperature is generally 40°–70° C., depending on the desired K-value. The polymerization can be conducted continuously or discontinuously.

According to the process of this invention, the polymer dispersion and the steam are continuously fed to a flow pipe wherein a pressure is 800–4660 mb., preferably 800–2320 mb. The temperature in the flow pipe is accordingly between 94° and 150° C., preferably 94°–125° C. An intimate intermixing of steam and dispersion takes place. The flow pipe should not contain any baffle installations. The residence time of the steam-dispersion mixture in the flow pipe is generally 0.01–5 seconds, preferably 0,01–1 seconds. At high pressures and correspondingly high temperatures, the residence time is only a few tenths of a second, whereas low pressures permit longer residence times within the indicated range.

The end of the flow pipe terminates in the upper portion of a degasification vessel. In the degasification vessel, the pressure is 133–660 mb., preferably 133–350 mb. The end of the flow pipe tapers to such an extent that the steam-dispersion mixture exits from the pipe at a speed of more than 30 m./sec. and the aforementioned pressure of between 800 and 4660 mb. is maintained in the flow pipe. With comparatively low pressures in the flow pipe, the exit velocity of the steam-dispersion mixture will be a little above 30 m./sec., whereas, when higher pressures are maintained, e.g. approximately 4660 mb., the exit velocity of the steam-dispersion mixture will approach the speed of sound in the present medium. The upper limit for the velocity at which the steam-dispersion mixture leaves the flow pipe is the sonic velocity in the provided medium. Suitably, the process will be conducted at exit velocities of the steam-dispersion mixture of 30–100 m./sec. The dispersion is immediately withdrawn from the degasification vessel, since it is unnecessary to maintain a specific residence time in the degasification vessel. The pressure difference between the flow pipe and the degasification vessel is 133–4530 mb., preferably 450–2197 mb. For conducting the process according to this invention, it is necessary to mix the steam and the dispersion, suitably in a weight ratio of 1:2 to 1:30, preferably 1:10. To ensure gentle treatment of the dispersion, saturated steam is employed. The steam and the dispersion are advantageously introduced at the head of the mixing pipe at right angles to each other. By the resultant strong frothing of the dispersion, a homogeneous mixture is instantaneously obtained.

Referring now to the Drawing, one apparatus suitable for effecting the process of this invention is shown. A flow pipe St is disposed on a degasification vessel E. The flow pipe has connections for the dispersion Di and the steam Da. The degasification vessel has a bottom drain A and a vacuum connection V, as well a a heatable or insulated jacket M. Advantageously, the ratio of the diameter to the length of the flow pipe St is 0.3–0.02:1.

The length of the pipe should be at least 20 cm. and at most 200 cm., preferably 70–150 cm. The process of this invention can be utilized to special advantage with dispersions obtained by continuous polymerization, since the polymerization and degasification can be connected directly in series to establish a complete continuity of manufacture and degasification. However, the process of the present invention is likewise suitable for dispersions obtained by discontinuous polymerization and thus having lower emulsifier contents.

The process makes it possible to degasify dispersions almost quantitatively, with a low expenditure for apparatus. The mechanical stress on the dispersion is minor, because the dispersion is conducted through the degasification apparatus along the shortest path, without the use of pumps. The stability of the dispersion thus remains unimpaired. The deposits of coagulate and sediment are minor, and the process operates practically with servicing requirements. The process operates especially economically because the amounts of steam employed are very low.

Defrothers need not be used for conducting the process.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLE 1

Using the apparatus shown in the Drawing, 6 liters/hr. of polyvinyl chloride dispersion (48% by weight solids content, emulsifier content 2.2% by weight, surface tension 32 dyn/cm.) are pumped through a pipe having an internal diameter of 9 mm. The dispersion has a vinyl chloride monomer content of 13,600 p.p.m. based on the polyvinyl chloride and a temperature of 20° C. The dispersion is mixed in the pipe with saturated steam from a saturator. The pressure in the flow pipe is 3413 mb., corresponding to 138° C.; the average residence time is 0.16 second, corresponding to a flow velocity of 1.2 m./sec. The mixture leaves the pipe via the nozzle D (diameter 0.8 mm.). The size of this nozzle was chosen so that the desired superatmospheric pressure to be measured at the manometer P, or the corresponding temperature to be measured at the thermocouple T, can be built up in the mixing pipe St. The velocity at which the steam-dispersion mixture exits from the nozzle is approximately equal to the sonic velocity in the present medium. The pipe section between the dispersion feed and the outlet nozzle has a length of 200 mm. The steam:dispersion ratio is 1:4.4.

Vinyl chloride and steam are continuously withdrawn from the degasification vessel E which is under a pressure of 660 mb., while the dispersion is continuously discharged via the bottom drain of the vessel. The residence time in the degasification vessel is about 1 second. The residual vinyl chloride content of the dispersion is 177 p.p.m., based on the solids content.

EXAMPLE 2

The procedure of Example 1 is repeated. The throughput of the dispersion is increased to about 6.8 l./h., so that the temperature in the mixing pipe rises to 143° C. corresponding to a steam pressure of 3930 mb.; the vinyl chloride monomer content of the dispersion utilized is 29,100 p.p.m./polyvinyl chloride. A final vinyl chloride content of 260 p.p.m./polyvinyl chloride is attained. The steam:dispersion ratio is 1:4.6.

EXAMPLE 3

At an inlet temperature of 50° C., 2 tons/hour of polyvinyl chloride dispersion (48% by weight of solids, 2.2% by weight of emulsifier content, surface tension 32 dyn/cm., vinyl chloride monomer content 14% by weight/polyvinyl chloride) is pumped through a pipe having a diameter of 15 cm. and a height of 96 cm., the end of which tapers to 20 mm. (angle of inclination 15°). The dispersion is mixed in the pipe with 200 kg./h. of saturated steam. The average residence time in the flow pipe is 0.85 second. The nozzle diameter is 20 mm. With this mode of operation, a temperature is obtained in the lower portion of the mixing pipe of 120° C., corresponding to a pressure of 1.95 bars. The exit velocity of the mixture from the flow pipe is about 60 m./sec. In the degasification vessel (capacity 3 m³) the ambient pressure is 200 mb., corresponding to 60° C. The residence time of the dispersion in the degasification vessel is 0.5–1 minute. A residual vinyl chloride content in the dispersion is obtained of 800 p.p.m./polyvinyl chloride.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a continuous process for removing monomeric impurites from an aqueous dispersion of homopolymers or copolymers of vinyl chloride having a surface tension below 60 dyn/cm. by treatment with steam while avoiding foam formation by a rapid lowering of the pressure at high flow velocities, the improvement which comprises:
   (a) continuously mixing said dispersion in a flow pipe with steam at a temperature of 120°–143° C. and corresponding steam pressure of 1950–3930 millibars for an average residence time of about 0.01–5 seconds;

(b) continuously passing the resultant admixture from said flow pipe at a velocity of at least 30 meters per second directly to a degasification vessel having a pressure of 133–660 millibars; and (c) continuously recovering a stable polymer dispersion containing less than 20 p.p.m. residual monomer impurities therefrom.

2. A process according to claim 1, wherein the weight ratio of steam:dispersion is 1:2 to 1:30 and the steam is saturated.

3. A process according to claim 2, wherein said ratio is about 1:10.

4. A process according to claim 1, wherein the exit velocity of said admixture from the flow pipe is 30–100 m./sec.

* * * * *